United States Patent [19]
Itoh et al.

[11] Patent Number: 4,747,327
[45] Date of Patent: May 31, 1988

[54] HYDRAULIC CONTROL APPARATUS FOR HYDRAULICALLY-OPERATED POWER TRANSMITTING SYSTEM HAVING CONTINUOUSLY VARIABLE TRANSMISSION

[75] Inventors: Hiroshi Itoh; Mitsuru Takada; Nobuyuki Kato, all of Toyota, Japan

[73] Assignee: Toyota Jidosha Kabushiki Kaisha, Toyota, Japan

[21] Appl. No.: 100,266

[22] Filed: Sep. 23, 1987

Related U.S. Application Data

[63] Continuation of Ser. No. 739,276, May 30, 1985.

[30] Foreign Application Priority Data

Jun. 18, 1984 [JP] Japan .................................. 59-123620

[51] Int. Cl.$^4$ ........................................... B60K 41/12
[52] U.S. Cl. ......................................... 74/868; 74/867
[58] Field of Search .................. 74/865, 866, 867, 868

[56] References Cited

U.S. PATENT DOCUMENTS

| | | | |
|---|---|---|---|
| 4,522,086 | 6/1985 | Haley | 74/867 |
| 4,534,243 | 8/1985 | Yokoyama et al. | 74/868 |
| 4,545,265 | 10/1985 | Abo et al. | 74/868 |
| 4,559,850 | 12/1985 | Sakakibara | 74/868 |
| 4,565,110 | 1/1986 | Ito | 74/867 X |

FOREIGN PATENT DOCUMENTS

| | | | |
|---|---|---|---|
| 64612 | 11/1983 | European Pat. Off. | |
| 3305924 | 9/1983 | Fed. Rep. of Germany | |
| 58-39877 | 3/1983 | Japan | 74/867 |
| 60-37455 | 2/1985 | Japan | |
| 60-157554 | 8/1985 | Japan | |
| 2076483 | 12/1981 | United Kingdom | |

*Primary Examiner*—Allan D. Herrmann
*Attorney, Agent, or Firm*—Oblon, Fisher, Spivak, McClelland & Maier

[57] ABSTRACT

A hydraulic control apparatus for controlling a hydraulically hydraulically-operated power transmitting system for an automotive vehicle, the transmitting system having a continuously variable transmission and an auxiliary transmission coupled to an output side of the continuously variable transmission. The controlling apparatus comprises a first pressure generator for generating a first line pressure used to operate the continuously variable transmission, and a second pressure generator for generating a second line pressure used to operate a frictional coupling assembly incorporated in the auxiliary transmission.

1 Claim, 10 Drawing Sheets

FIG. 2

| SHIFT POSITIONS | | HIGH-RANGE CLUTCH 56 | LOW-RANGE BRAKE BAND 58 | REVERSE BRAKE BAND 60 | SPEED RATIO OF AUX. TRANSMISSION |
|---|---|---|---|---|---|
| L (LOW) AND D (DRIVE) | LOW RANGE | × | ○ | × | $1 + \dfrac{\rho 1}{\rho 2}$ |
| | HIGH RANGE | ○ | × | × | 1 |
| N (NEUTRAL) | | × | × | × | — |
| R (REVERSE) | | × | × | ○ | $-\left(1 - \dfrac{1}{\rho 2}\right)$ |

HYDRAULIC CONTROL APPARATUS FOR HYDRAULICALLY-OPERATED POWER TRANSMITTING SYSTEM HAVING CONTINUOUSLY VARIABLE TRANSMISSION

This is a continuation of application Ser. No. 06/739,276, filed May 30, 1985.

BACKGROUND OF THE INVENTION

1. Field of the Art

The present invention relates to a hydraulic control apparatus for controlling a hydraulically-operated power transmitting system used in an automotive vehicle, having a continuously variable transmission (hereinafter referred to as "CVT").

2. Related Art Statement

A power transmitting system for a vehicle including a CVT is provided with an auxiliary transmission for changing a direction of drive of the vehicle and for improvement in drivability.

For example, a power transmitting system is disclosed in Japanese Patent Application No. 58-144985 (laid open under Publication Nos. 60-37455) and 59-12017, which includes a CVT, and an auxiliary or secondary transmission having a frictional coupling device. In such a transmitting system, a common hydraulic line pressure is used to operate the CVT and the frictional coupling device of the auxiliary transmission.

In the case where the auxiliary transmission is coupled to the output side of the CVT, an input torque of the CVT is equal to an output torque of an engine of a vehicle on which the transmitting system is provided. This arrangment is advantageous in terms of constructional simplicity or compactness and durability of the CVT. It is recognized that an input torque of the auxiliary transmission, i.e., a torque acting on the frictional coupling assembly is varied with a speed ratio "r" ($N_{in}/N_{out}$, where $N_{in}$ and $N_{out}$ represent rotating speeds of input and output shafts, respectively). Accordingly, it is necessary to determine a line pressure of the transmitting system so that the level of the line pressure is high enough to cope with the maximum input torque of the auxiliary transmission at each level of output torque of the engine. However, the operation of the transmitting system with such a relatively high level of line pressure is disadvantageous in term of durability of the frictional coupling assembly of the auxiliary transmission and the CVT.

When the auxiliary transmission of the transmitting system has plural forward-drive shift positions, inadequate control of the line pressure will cause the auxiliary transmission to suffer a shift-up or shift-down shock upon shifting from one position to another, thereby degrading a driving feel or comfort of the automotive vehicle. In the meantime, the line pressure must be held relatively high for avoiding slipping actions of a transmission belt of the CVT. Thus, it has been considered difficult to restrain the shifting shock of the auxiliary transmission while avoiding the slippage of CVT belt.

SUMMARY OF THE INVENTION

It is therefore an object of the present invention to provide an improved hydraulic control apparatus for controlling a hydraulically-operated power transmitting system including a continuously variable transmission and an auxiliary transmission, which apparatus assures increased durability and enhanced power transmitting performance of the continuously variable transmission and the auxiliary transmission.

According to the present invention, there is provided a hydraulic control apparatus for controlling a hydraulically-operated power transmitting system for an automotive vehicle, the transmitting system having a continuously variable transmission and an auxiliary transmission coupled to an output side of the continuously variable transmission, the apparatus comprising: first pressure-generating means for generating a first line pressure used to operate the continuously variable transmission; and second pressure-generating means for generating a second line pressure used to operate a frictional coupling assembly incorporated in the auxiliary transmission.

In the hydraulic control apparatus constructed as described above according to the invention, the first and second line pressures used respectively for the continuously variable transmission and the frictional coupling assembly of the auxiliary transmission may be controlled independently of each other by means of a first and a second pressure generator valve, respectively, whereby the level of the first line pressure is adjustable to suit the continuously variable transmission, while the level of the second line pressure is adjustable to meet the auxiliary transmission. This arrangement therefore permits increased durability of the power transmitting system, while maintaining a high degree of torque transmission.

According to one advantageous embodiment of the invention, the second pressure-generating means generates the second line pressure, based on an output torque of an engine of the automotive vehicle, and on a speed ratio of the continuously variable transmission. In this embodiment, the second line pressure may be controlled to an adequate level, as a function of the output torque "Te" and the speed ratio "r", since the input torque of the auxiliary transmission, that is, the torque acting on the frictional coupling assembly of the auxiliary transmission is changed in relation to the output torque "Te" of the engine as well as to the speed ratio "r" of the CVT.

Moreover, the control of the second line pressure independently of the first line pressure contributes to restraining shifting shocks upon shifting of the auxiliary transmission while preventing slippage of a transmission belt of the CVT, in the case where the auxiliary transmission has plural forward-drive shift positions for forward driving of the vehicle.

According to a preferred arrangement wherein plural forward-drive shift positions are available on the auxiliary transmission, the plural forward-drive shift positions include a drive position, and the second pressure-generating means comprises: an input port to which the first line pressure is applied while the drive position is selected; an output port from which the second line pressure is generated while the drive position is selected; and a valve spool for controlling a cross sectional area of fluid communication between said input and output ports. The valve spool receives a speed-ratio pressure corresponding to the speed ratio of the continuously variable transmission, a feedback pressure corresponding to the second line pressure, and a throttle pressure corresponding to an angle of opening of a throttle valve of the engine. The speed-ratio pressure and the feedback pressure act on the valve spool so as to move the valve spool in one of opposite directions, while the throttle pressure acts on the valve spool so as to move the valve spool in the other direction.

In accordance with another advantageous embodiment of the invention, the continuously variable transmission is of belt-and-pulley type including a first variable-diameter pulley, and a second variable-diameter pulley, a transmission belt connecting the first and second variable-diameter pulleys, and first and second actuators for changing respective effective diameters of the first and second variable-diameter pulleys. In this instance, the first line pressure is applied to one of the first and second actuators for controlling a tension of the transmission belt.

BRIEF DESCRIPTION OF THE DRAWING

The foregoing and other objects, features and advantages of the present invention will be readily appreciated as the same becomes better understood by reference to the following detailed description, when considered in connection with the accompanying drawing, in which:

FIG. 2 is a view showing a relation between shift positions of an auxiliary transmission and operating states of a frictional coupling assembly of the auxiliary transmission;

DETAILED DESCRIPTION OF THE PREFERRED EMBODIMENT

Referring to the accompanying drawing, a preferred embodiment of the invention will be described.

Figure 1:
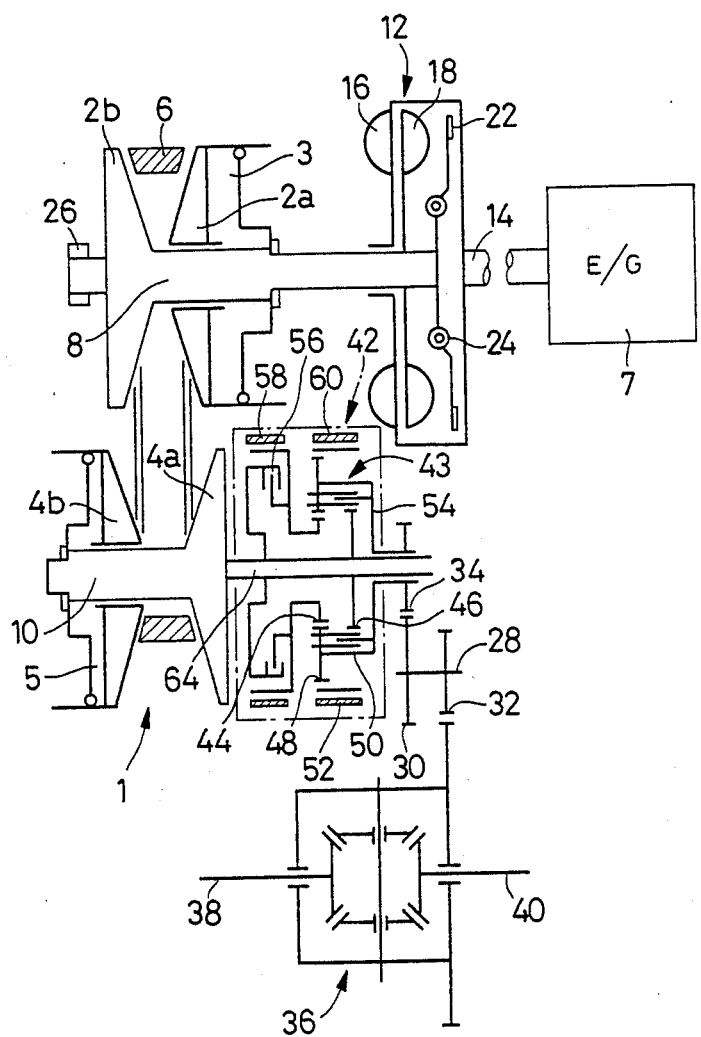
FIG. 1 is a schematic illustration of essential parts of a power transmitting system incorporating a continuously variable transmission.

There is shown in FIG. 1 a continuously variable transmission (hereinafter referred to as "CVT") generally indicated at 1. The CVT 1 includes a pair of input pulley elements 2a, 2b which form a first variable-diameter pulley, a pair of output pulley elements 4a, 4b which form a second variable-diameter pulley, and a transmission belt 6 which connects the input and output pulley elements 2a, 2b and 4a, 4b to transmit power from an engine 7 of an automative vehicle. The input pulley element 2a is disposed on an input shaft 8 such that the element 2a is movable axially of the input shaft 8 but not rotatably relative to the shaft 8. The other input pulley element 2b is fixed to the input shaft 8. The output pulley element 4a is fixed to an output shaft 10, while the other output pulley element 4b is disposed on the output shaft 10 axially movably but not rotatably with respect to the shaft 10. The input pulley elements 2a, 2b, and the output pulley elements 4a, 4b have opposed surfaces which are tapered such that a distance between the tapered surfaces increases in a radially outward direction. In the meantime, the transmission belt 6 has a trapezoidal cross sectional shape to suit the opposed tapered surfaces of the pulley elements 2a, 2b, 4a, 4b. An output pulley cylinder or actuator 5 is provided to move the output pulley element 4b, primarily for changing a tension of the belt 6. The hydraulic pressure to move the output pulley element 4b relative to the output pulley element 4a is controlled to be as low as possible to the extent that the transmission belt 6 may attain power transmission without slippage on the pulleys. In the meantime, an input pulley cylinder or actuator 3 is provided to move the input pulley element 2a, for changing an effective diameter of the first variable-diameter pulley 2a, 2b (a diameter at which the belt 6 engages the pulley). The hydraulic pressure to move the input pulley element 2a relative to the input pulley element 2b primarily determines a speed ratio "r" of the CVT 1 ($N_{in}/N_{out}$=ratio of a rotating speed $N_{in}$ of the input shaft 8 over a rotating speed $N_{out}$ of the output shaft 10). A fluid coupling 12 is provided, which has a pump impeller 16 connected to a crank shaft 14 of the engine 7, and a turbine 18 which is fixed to the input shaft 8 and is rotated by rotation of the pump impeller 16 via a fluid in the coupling 12. In the fluid coupling 12, there is incorporated a direct-coupling lock-up clutch 22 which serves to directly connect the crank shaft 14 to the input shaft 8. The direct-coupling lock-up clutch 22 is provided with dampers 24 which absorb or accommodate a shock upon disengagement of the lock-up clutch 22, and a variation in torque of the engine 7. When the running speed of the vehicle or the operating speed of the engine 7 exceeds a predetermined limit, the lock-up clutch 22 is engaged so as to prevent loss of power due to transmission by the fluid coupling 12. The pump impeller 16 is rotated together with an oil pump 26 (FIG. 3) which delivers a pressurized fluid to the CVT 1, fluid coupling 12, etc., via a hydraulic control device which will be described. In parallel with the output shaft 10, there is disposed a counter shaft 28 to which are fixed two gears 30, 32. The engine power from the output shaft 10 of the CVT 1 is transmitted to a differential gear 36 through a gear 34 disposed coaxially with the output shaft 10, and through the gears 30, 32 on the counter shaft 28. The power transmitted to the differential gear 36 is further transmitted to drive wheels of the vehicle via left and right axles 38, 40. An auxiliary transmission 42 is disposed coaxially with the output shaft 10 of the CVT 1. This auxiliary transmission 42 includes a complex planetary gear set 43 of RAVIGNEAUX type which includes a first and a second sun gear 44, 46, a first planetary gear 48 meshing with the first sun gear 44, a second planetary gear 50 meshing with the second planetary gear 46, a ring gear meshing with the first planetary gear, and a planet carrier 54 which rotatably supports the first and second planetary gears 48, 50. The second sun gear 46 is coupled to a shaft 64 which is integral with the output shaft 10 of the CVT 1 and which serves as an input shaft of the auxiliary transmission 42. The carrier 54 is connected to the gear 34. A high-range clutch 56 is applied to connect the first sun gear 44 and the shaft 64, while a low-range brake band 58 is applied to hold the first sun gear 44 stationary. The ring gear 52 is held stationary by a reverse brake band 60. The high-range clutch 56, low-range brake band 58 and reverse brake band 60 are operated by actuators 57, 59 and 61 (FIG. 5), respectively, and these components 56–61 constitute a frictional coupling assembly.

FIG. 2 shows operating states of the above elements of the frictional coupling assembly build in the auxiliary transmission 42, and speed reduction ratios, in relation with shift positions of the transmission 42. In the figure, marks "o" indicate the engagement or application of the clutch or band 56, 58, 60, while marks "x" indicate their disengagement or release. Values p1 and p2 are obtained from the following equations:

$$p1 = Zs1/Zr$$

$$p2 = Zs2/Zr$$

where
$Zs1$: number of teeth of the first sun gear 44,
$Zs2$: number of teeth of the second sun gear 46,
$Zr$: number of teeth of the ring gear 52.

Stated more specifically, a low range in a shift position L (Low) or D (Drive) is established with the first sun gear 44 held stationary by application of the low-range brake band 58. In this low range, the power transmission by the auxiliary transmission 42 is effected at a reduction ratio of $(1+p1/p2)$. A high range in the shift position L or D is established by the engagement of the high-range clutch 56, which causes the planetary gear set 43 to rotate together with the clutch 56. In this high range, the power transmission is effected at a reduction ratio of 1. In a shift position R (Reverse), the reverse brake band 60 is applied to hold the ring gear 52 stationary, whereby the power transmission is effected in the reverse direction at a reduction ratio of $(1-1/p2)$.

Figure 3:
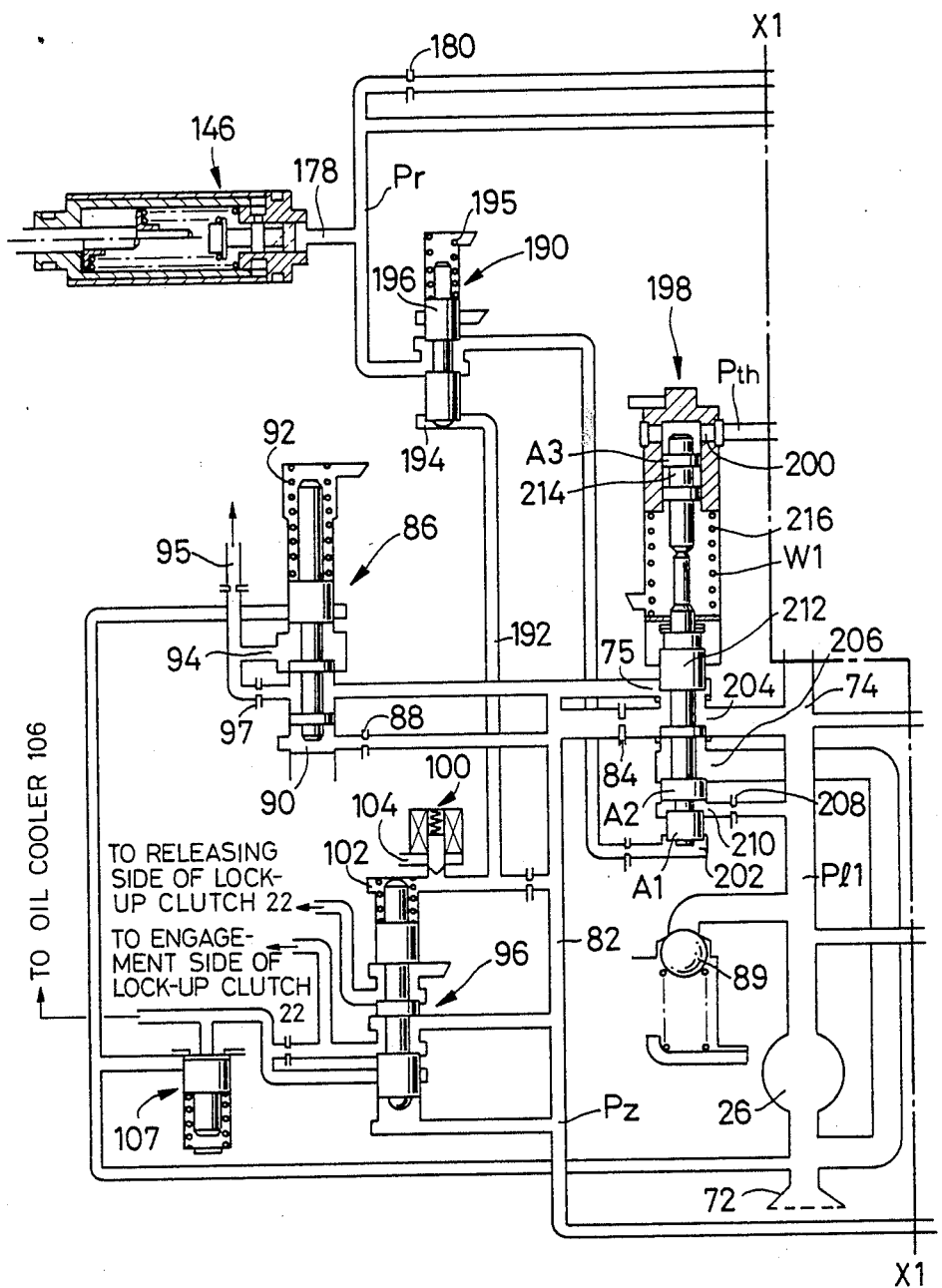
FIGS. 3 through 5 are schematic views of a hydraulic control device for controlling the operations of the continuously variable transmission and the auxiliary transmission of FIG. 1.
Figure 4:
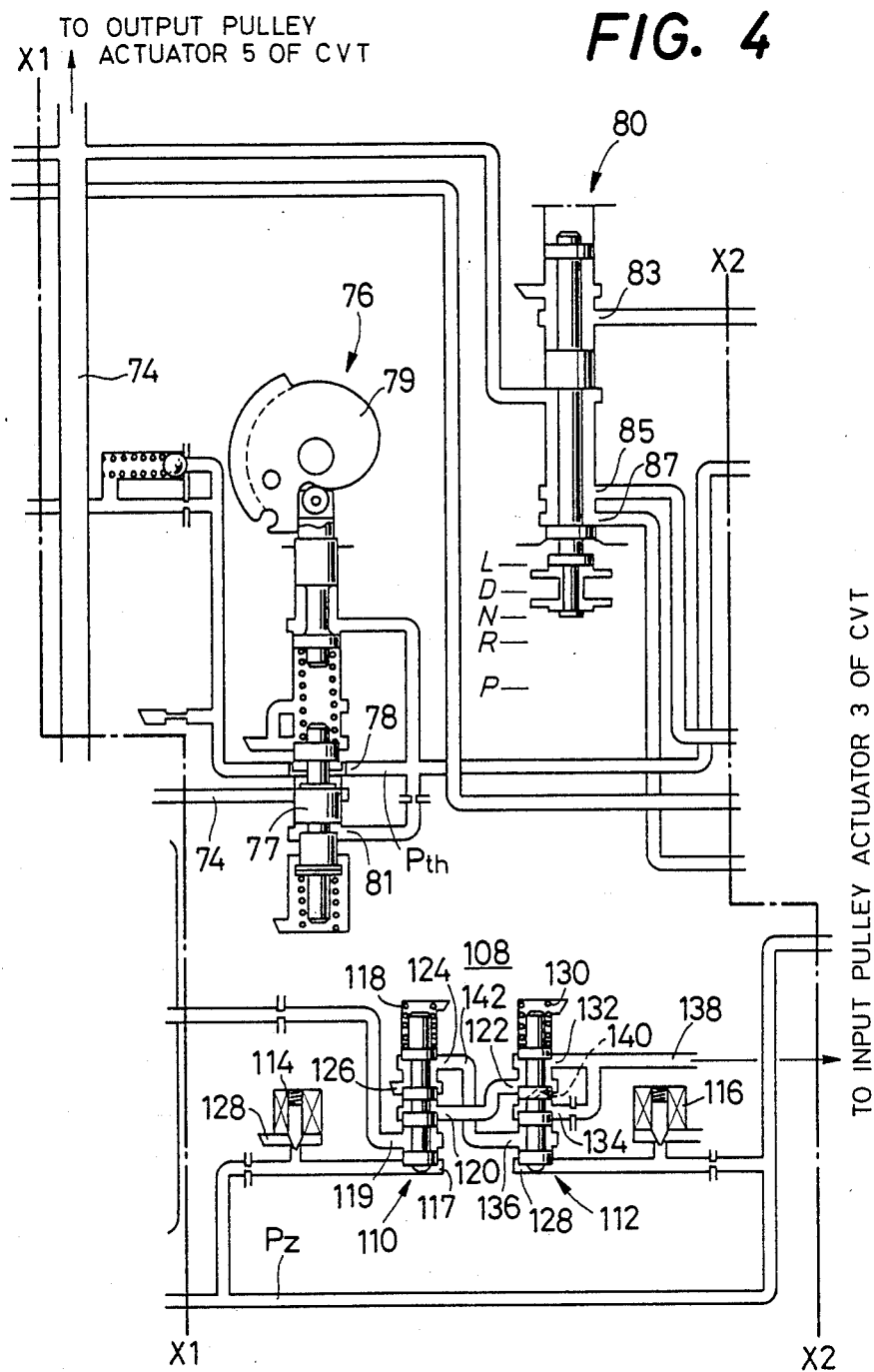
Figure 5:
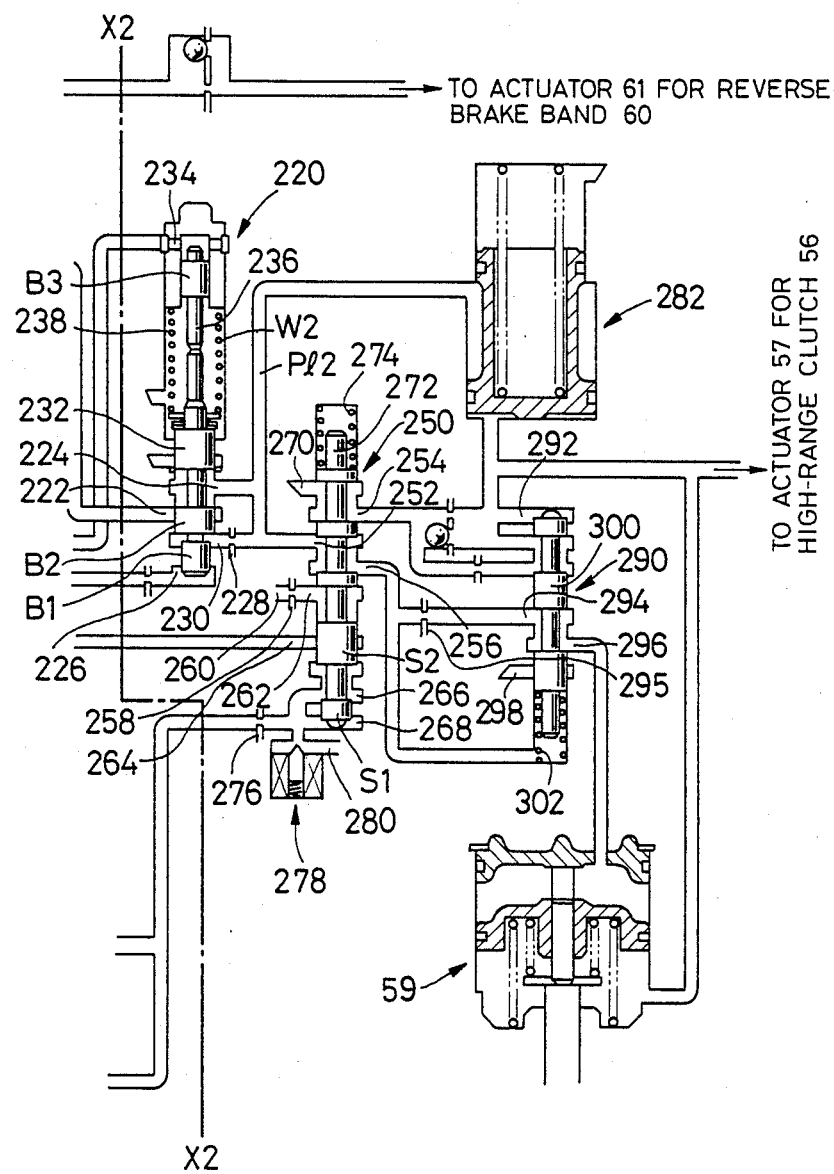

A hydraulic control arrangement is illustrated in FIGS. 3-5, wherein the oil pump 26 sucks up the working fluid through a strainer 72, and delivers the fluid under pressure to a line conduit 74. A throttle valve generally indicated at 76 in FIG. 4 generates at its output port 78 a throttle pressure "Pth" which corresponds to an angle $\theta$ of its opening. In other words, the throttle pressure "Pth" corresponds to an output torque of the engine 7. The throttle valve 76 has a valve spool 77 which receives an operating pressure a throttle cam 79 that increases with the opening angle $\theta$, and the throttle pressure "Pth" from a control port 81 as a feedback pressure. These operating pressure and the feedback pressure act on the valve spool 77 in the opposite directions. Thus, the valve spool 77 controls the communication between the line conduit 74 and the output port 78. There is provided a manual valve 80 having a spool whose axial position is changed according to a selected position of a shift lever which has five shift positions L (Low), D (Drive), N (Neutral), R (Reverse) and P (Parking). The manual valve 80 applies a first line pressure Pl1 of the line conduit 74 to a port 83 when the shift position R (Reverse) is selected, and applies the first line pressure Pl1 to a port 85 when the shift position L (Low) is selected. In the shift position D (Drive), the manual valve 80 applies the first line pressure Pl1 to ports 85 and 87.

To protect the hydraulic control device, a pressure relief valve 89 is provided adjacent to the oil pump 26, to release the working fluid from the line conduit 74 when the first line pressure Pl1 exceeds a predetermined upper limit.

A secondary pressure conduit 82 is connected to the line conduit 74 through an orifice 84, and through a port 85 of a primary pressure regulator valve 198 through which an excess of the fluid is drained from the valve 198. The secondary pressure conduit 82 is connected through an orifice 88 to a control chamber 90 which is formed in a secondary pressure regulator valve 86. This regulator valve 86 controls the communication between the secondary pressure conduit 82 and a port 94, according to the pressure in the control chamber 90 in relation to a biasing force of a spring 92, so that a secondary pressure Pz in the secondary pressure conduit 82 is maintained at a suitable level. The secondary pressure conduit 82 is connected to a lubrication conduit via the port 94 or an orifice 97. The previously indicated direct-coupling lock-up clutch 22 incorporated in the fluid coupling 12 in parallel is engaged or disengaged under control of a lock-up control valve 96 which applies the secondary pressure Pz in the secondary pressure conduit 82 selectively to one of opposite sides (engagement side or release side) of the lock-up clutch 22. A solenoid valve 100 is provided to control the communication between a control chamber 102 of the lock-up control valve 96 and a drain 104. When the solenoid valve 100 is off (deenergized), the secondary pressure Pz of the secondary pressure conduit 82 is applied to the release side of the lock-up clutch 22, whereby the power from the engine 7 is transmitted to the CVT 1 through the fluid-coupling 12. When the solenoid valve 100 is on (energized), the secondary pressure Pz of the secondary pressure conduit 82 is applied to the engagement side of the lock-up clutch 22 and to the oil cooler 102. In this condition, the engine power is transmitted to the CVT 1 through the lock-up clutch 22. The fluid pressure in the oil cooler 106 is adjusted by a cooler by-pass valve 107.

A speed-ratio control valve assembly is indicated generally at 108 in FIG. 4, which includes a first spool valve 110, a second spool valve 112, a first solenoid valve 114, and a second solenoid valve 116. While the first solenoid valve 114 is off, the spool of the first spool valve 110 is moved toward a spring 118 by the secondary pressure Pz in a control chamber 117. In this condition, the first line pressure Pl1 at a port 119 is applied to a port 122 of the second spool valve 112 via a port 120 of the first spool valve 110, and a port 124 is not in communication with a drain 126. While the second solenoid valve 114 is on, the spool of the first spool valve 110 is pushed toward the chamber 117 by the spring 118. In this condition, the line pressure is not applied to the port 120, and the port 124 is brought into communication with the drain 126. While the second solenoid valve 116 is off, the spool of the second spool valve 112 is pushed toward a spring 130 by the secondary pressure Pz in a control chamber 128. In this condition, the port 122 is not in communication with a port 132, and a port 134 is in communication with a port 136. The ports 132 and 134 are held in communication with the input pulley actuator 3 of the CVT 1 through a line 138. While the second solenoid valve 116 is off, the spool of the second spool valve 112 is moved toward the chamber 128 by the spring 130. In this condition, the ports 122 and 132 communicate with each other while the ports 134 and 136 are not in communication. The port 136 is connected with the port 124 through a line 142. An orifice 140 is provided in the second spool valve 112 to permit a small flow of the fluid from the port 122 to the port 132 while the second solenoid valve 116 is off. In the above arrangement, therefore, the fluid is supplied to the actuator 3 of the CVT 1 at a high rate while the first solenoid valve 114 is off and the second solenoid valve 116 is on, whereby the speed ratio "r" of the CVT 1 is decreased relatively rapidly. While the first and second solenoid valves 114 and 116 are both off, the supply of the fluid to the actuator 3 is accomplished through the orifice 140, and consequently the speed ratio "r" is decreased slowly. While the first and second solenoid valves 114 and 116 are both on, the actuator 3 of the CVT 1 is not supplied with the pressurized fluid, whereby the speed ratio "r" of the CVT 1 is held constant. While the first solenoid valve 114 is on and the second solenoid valve 116 is off, the fluid in the actuator 3 is discharged through the drain 126, and the speed ratio "r" of the CVT 1 is rapidly increased.

Figure 6:
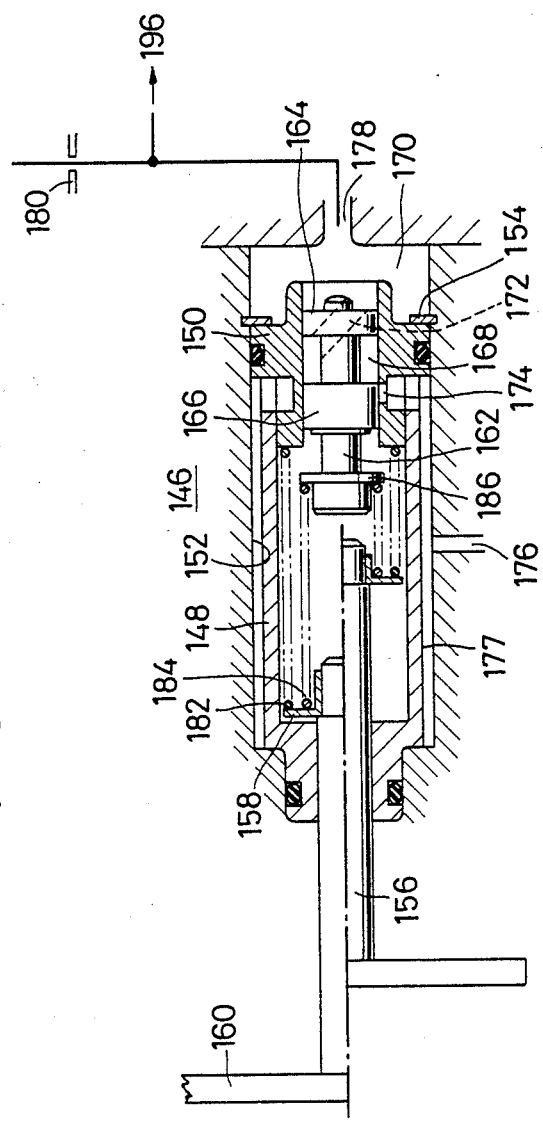
FIG. 6 is a view illustrating a speed-ratio sensing valve.
Figure 7:
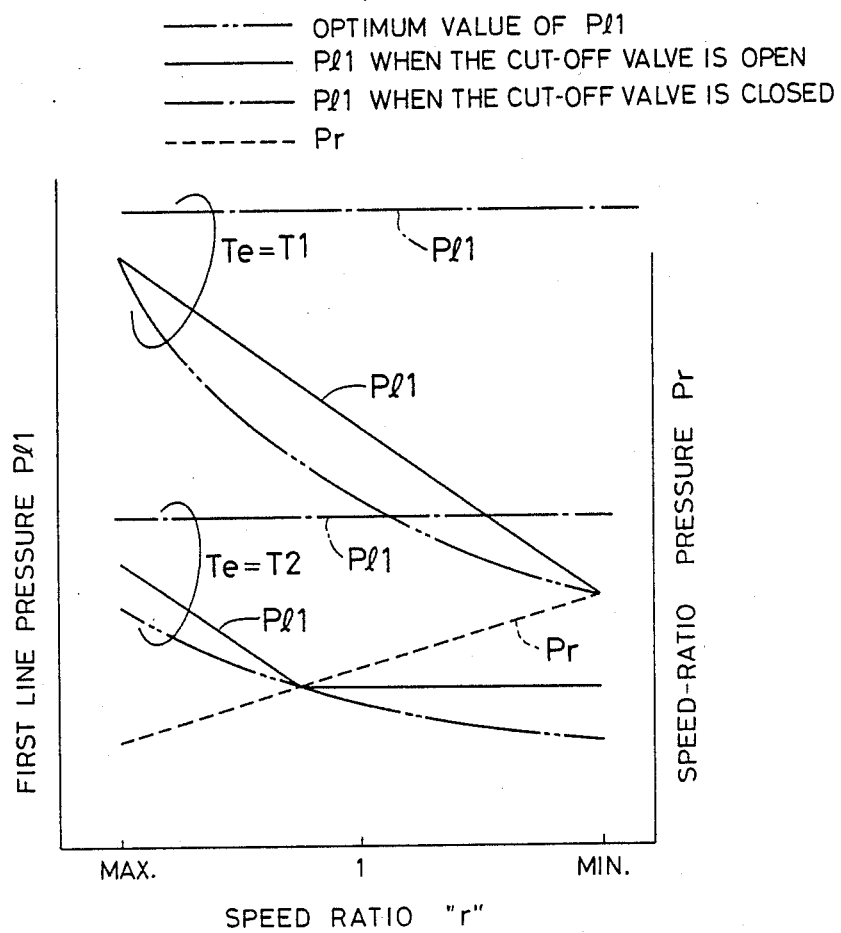
FIGS. 7 and 8 are graphical representations indicating characteristics of a first line pressure used to operate the continuously variable transmission.
Figure 8:
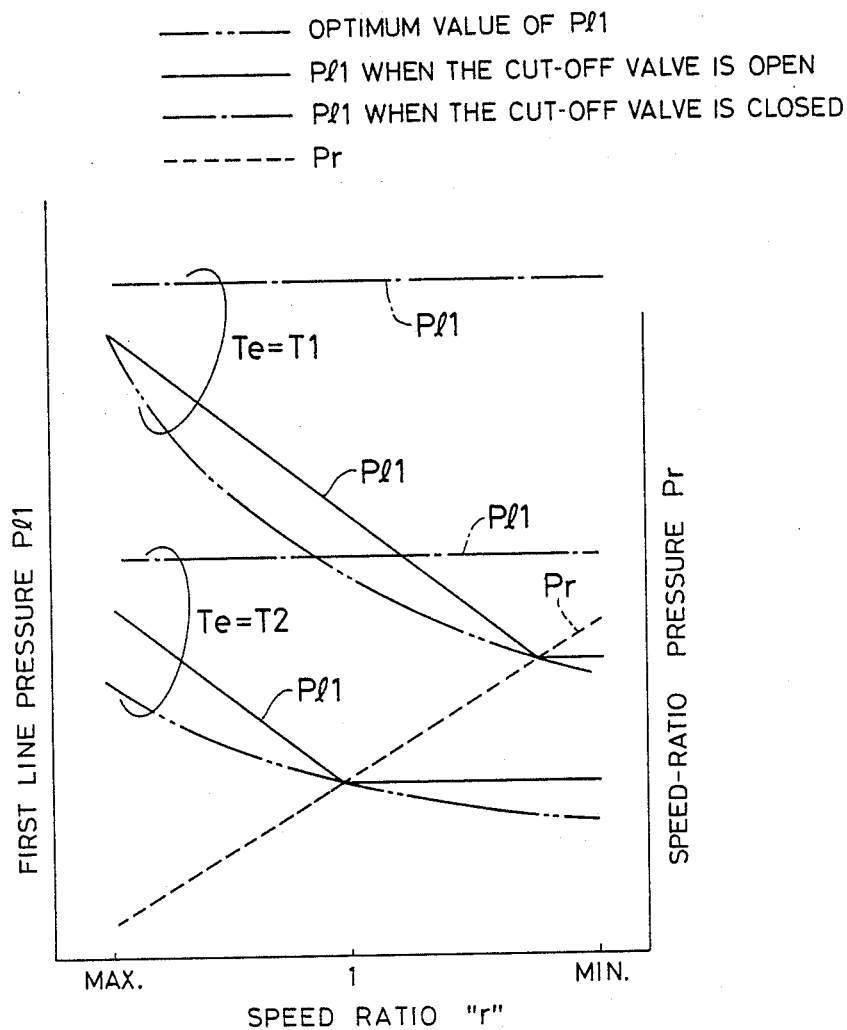

A speed-ratio sensing valve 146 is illustrated in detail in FIG. 6, wherein sleeves 148 and 150 are disposed coaxially within a bore 152, and retained in the axial direction by a retaining ring 154. A rod 156 extends through an end portion of the sleeve 148 and is retained by a spring seat 158. Another rod 160 is secured at its one end to the rod 156, and is held at its other end in engagement with the input pulley element 2a so that the element 2a is rotatable relative to the rod 160. The rod 160 moves the rod 156 in the axial direction by a distance equal to an amount of axial displacement of the input pulley element 2a. A spool 162 having lands 164 and 166 is axially slidably fitted in the sleeve 150. The spool 162 has a passage 172 which communicates with an annular space between the two lands 164, 166, and with an oil chamber 170. The land 166 controls an amount of opening of a port 174 with respect to the annular space 168. The port 174 communicates with a drain 176 via an annular space between the outer surface of the sleeve 148 and the inner surface of the bore 152. The oil chamber 170 is formed with an output port 170 from which a control pressure Pc is produced. The output port 170 communicates with the line conduit 74 via an orifice 180. A spring 182 is interposed between the spring seat 158 and the sleeve 150, to bias the rod 156 in a direction away from the sleeve 148. In the meantime, a spring 184 is interposed between the spring seat 158 and a flange 186 of the spool 162, in order to bias the spool 162 in a direction toward the oil chamber 170. The speed ratio "r" of the CVT 1 is increased as the distance of the movable input pulley element 2a relative to the stationary input pulley element 2b is increased. Since the rod 156 is moved outward from the sleeve 148 as the movable input pulley element 2a is moved away from the stationary input pulley element 2b, the force of the spring 184 biasing the spool 162 toward the oil chamber 170 is reduced. As a result, the spool 162 is moved toward the rod 156, and the land 166 increases the area of opening of the port 174, whereby a speed-ratio pressure Pr from the output port 178 is decreased. The speed-ratio pressure Pr is established by controlling the amount of fluid discharge from the output port 178. Accordingly, the speed-ratio pressure Pr is held not higher than the line pressure Pl1. Dashed lines in FIGS. 7 and 8 represent two different relations between the speed-ratio pressure Pr and the speed ratio "r". As described later, the first line pressure Pl1 is decreased as the speed ratio "r" is reduced. After the speed ratio "r" has fallen down to a speed ratio "r1" (which varies as a function of the throttle pressure Pth, i.e., as a function of the engine torque Te) at which the speed-ratio pressure Pr is equal to the first line pressure Pl1, the speed-ratio pressure Pr is equal to the first line pressure Pl1. Two-dot chain lines in FIGS. 7 and 8 indicate an optimum value of the first line pressure Pl1, wherein T1 is greater than T2.

A cut-off valve 190 includes a chamber 194 which communicates with the control chamber 102 of the lock-up control valve 96 via a line 192, and further includes a spool 196 which is moved based on the pressure in the chamber 194 and a biasing force of a spring 195. While the solenoid valve 100 is off, that is, while the lock-up clutch 22 is released (for absorbing a shock of the transmission system when the auxiliary transmission 42 is shifted), the cut-off valve 190 is placed in its closed position to prevent the speed-ratio pressure Pr from being applied to the primary pressure regulator valve 198.

The primary pressure regulator valve 198, which serves as first pressure-generating means, has: a port 200 to which the throttle pressure Pth is applied; a port 202 to which the speed-ratio pressure Pr is applied; a port 204 connected to the line conduit 74; a port 206 connected to a suction side of the oil pump 26; a port 210 to which the first line pressure Pl1 is applied via an orifice 208; a spool 212 which is axially movable to control the communication between the ports 204 and 206; a spool 214 which receives the throttle pressure Pth and biases the spool 212 toward the port 202; and a spring 216 which biases the spool 212 toward the port 202.

While the cut-off valve 190 is open and the speed-ratio pressure Pr is applied to the port 202, the following equation is established:

$$Pl1 = (A3 \cdot Pth + W1 - A1 \cdot Pr)/(A2 - A1) \quad (1)$$

where,
A1: cross sectional area of the lowermost land of the spool 212,
A2: cross sectional area of the land next to the lowermost land of the spool 212,
A3: cross sectional area of the land of the spool 214 receiving the throttle pressure Pth,
W1: biasing force of the spring 216.

While the cut-off valve 190 is closed and the speed-ratio pressure Pr is not applied to the port 202, the following equation is established:

$$Pl1 = (A3 \cdot Pth + W1)/(A2 - A1) \quad (2)$$

The pressures Pl1 defined by the above two equations are indicated by solid and one-dot chain lines, in FIGS. 7 and 8, respectively.

A sub-primary pressure regulator valve 220, which serves as second pressure-generating means, has: an input port 222 to which is applied the first line pressure Pl1 from the port 85 of the manual valve 80 while the shift position L or D is selected; an output port 224 from which a second line pressure Pl2 is generated; a port 226 to which the speed-ratio pressure Pr is applied; a port 230 to which is applied through an orifice 228 the second line pressure Pl2 which serves as a feedback pressure; a spool 232 which controls the communication between the input and output ports 222 and 224; a port 234 to which the throttle pressure Pth is applied; a spool 236 which receives the throttle pressure Pth and biases the spool 232 toward the port 226; and a spring 238 which biases the spool 232 toward the port 226. In this sub-primary pressure regulator valve 220, the following equation is established:

$$Pl2 = (B3 \cdot Pth + W2 - B1 \cdot Pr)/(B2 - B1) \quad (3)$$

where,

B1: cross sectional area of the lowermost land of the spool 232,

B2: cross sectional area of the land next to the lowermost land of the spool 232, B3: cross sectional area of the land of the spool 236 receiving the throttle pressure Pth, W2: biasing force of the spring 238.

Figure 9:
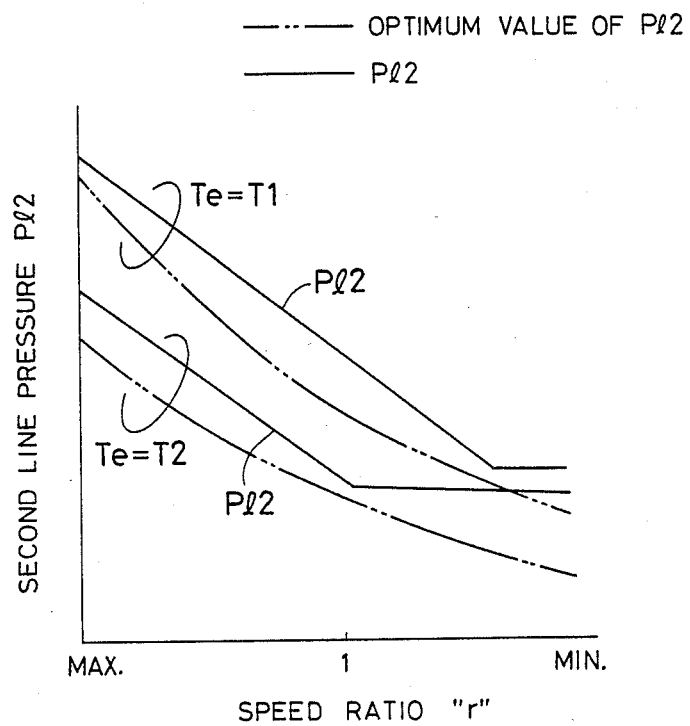
FIG. 9 is a graphical representation indicating characteristics of a second line pressure used to operate the auxiliary transmission.

FIG. 9 indicates a relation between the second line pressure Pl2 generated by the sub-primary pressure regulator valve 220, and its ideal value.

A shift valve 250 has: a port 252 to which is applied the second line pressure Pl2 while the shift position D or L is selected; output ports 254, 256; a port 262 communicating with a drain 260 via an orifice 258; a control port 264 to which is applied the first line pressure Pl1 from the port 87 of the manual valve 80 when the shift position D is selected; other control ports 266, 268; a drain 270; a spool 272; and a spring 274 biasing the spool 272 toward the port 268. The secondary pressure Pz is applied to the control ports 266, 268 via an orifice 276, and the pressure at the control ports 266, 268 is regulated by a solenoid valve 278. The two lands of the spool 272 as counted from its bottom have cross sectional areas S1 and S2, respectively. The area S1 is smaller than the area S2. The solenoid valve 278 is turned on and off in relation to driving parameters of an automotive vehicle. While the solenoid valve 278 is on, the fluid is discharged from a drain 280.

When the spool 272 is located on the side of the spring 274, the input port 252 is in communication with the output port 254, and the output port 256 is in communication with the drain 260 via the port 262 and the orifice 258. Accordingly, the second line pressure Pl2 is delivered from the output port 254 to an accumulator 282, and to an actuator 57 of the high-range clutch 56, whereby the auxiliary transmission 42 is placed in the high-range position.

When the spool 272 is located on the side of the port 268, the input and output ports 252, 256 communicate with each other, and the output port 254 is in communication with the drain 270. Consequently, the second line pressure Pl2 from the output port 256 is delivered to an actuator 59 of the low-range brake band 58, whereby the auxiliary transmission 42 is placed in the low-range position.

While the shift position L is selected, the first line pressure Pl1 is not applied to the control port 264. Therefore, when the solenoid valve 278 is turned off, the spool 272 is moved toward the spring 274 initially by the secondary pressure Pz acting on the land with the cross sectional area S2, and subsequently by the secondary pressure Pz acting on the land with the cross sectional area S1. When the solenoid valve 278 is turned on, the pressure at the control ports 272, 268 is decreased and the spool 272 is moved by the spring 274 toward the port 268. In the shift position L, therefore, the auxiliary transmission 42 may be switched between its high-range and low-range positions according to the on-off states of the solenoid valve 278.

In the shift position D, the first line pressure Pl1 is applied to the control port 264. Consequently, once the spool 272 has been located on the side of the spring 274, the first line pressure Pl1 from the control port 264 acts on the land with the cross sectional area S2. Subsequently, the spool 272 is held located on the side of the 274, irrespective of the subsequent on-off state of the solenoid valve 272, whereby the auxiliary transmission 42 is held in its high-range position.

A shift-timing valve 290 has: a control port 292 communicating with the actuator 57 of the high-range clutch 56; an input port 294 communicating with the output port 256 of the shift valve 250; an output port 296 communicating with the actuator 59 of the low-range brake band 58; a drain 298; a spool 300; and a spring 302 biasing the spool 300 toward the port 292. When the shift valve 250 is switched from the low-range position to the high-range position, the second line pressure Pl2 is delivered from the output port 254 to the actuator 57 of the high-range clutch 56. However, while the pressure in the actuator 57 of the high-range clutch 56 is relatively low, the spool 300 is held on the side of the port 292 by the spring 302, the fluid in the actuator 59 of the low-range brake band 58 is discharged slowly from the drain 260 via the port 262 of the shift valve 250 and the orifice 258. As the pressure in the actuator 57 of the high-range clutch 56 is elevated, the spool 300 is moved against the force of the spring 302 by the pressure at the port 292, whereby the fluid in the actuator 59 of the low-range brake band 58 is discharged rapidly from the drain 298 of the shift-timing valve. As a result, upon the auxiliary transmission 42 being shifted up, the release of the low-range brake band 58 is suitably delayed, in order to alleviate a shifting shock of the transmission 42.

The secondary pressure Pz from the secondary pressure conduit 82 is applied to the solenoid valves 100, 114, 116 and 278, and serve to release the secondary pressure Pz as required. In a hydraulic control device disclosed in Japanese Patent Application No. 59-12017 previously indicated, however, the throttle pressure Pth is applied to solenoid valves. In this case, therefore, the biasing force of a spring and the force generated by a solenoid coil must be determined so as to cope with the maximum throttle pressure. Accordingly, the solenoid valve must be relatively large-sized, and the response characteristics of a spool of a spool valve associated with the solenoid valve are degraded when the throttle pressure is relatively low. Further, the spring force acting on the spool is difficult to set. In the illustrated embodiment wherein the secondary pressure Pz is used for the solenoid valves, the above-indicated disadvantages are eliminated, and the freedom of designing of the device is improved.

Figure 10:
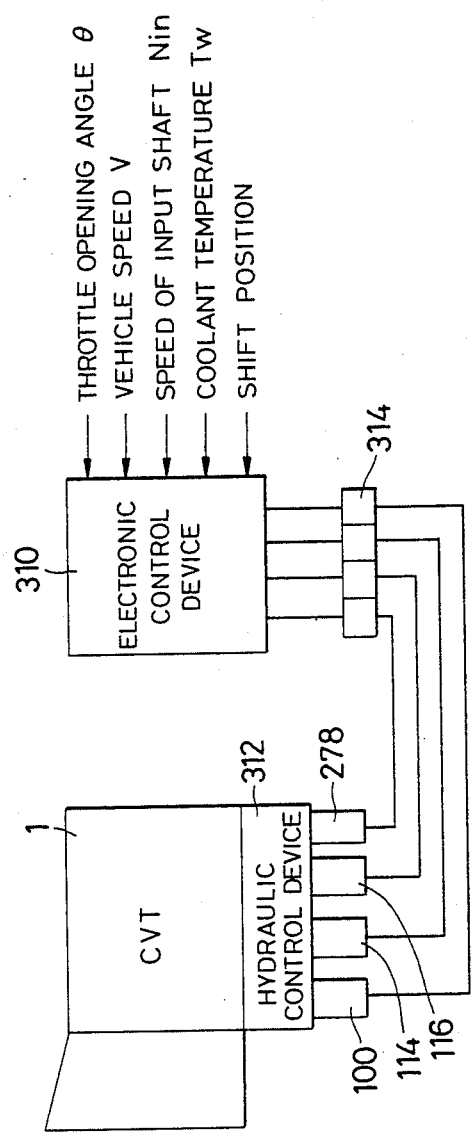
FIG. 10 is a schematic diagram showing a general control arrangement for controlling the power transmitting system.

FIG. 10 is a schematic block diagram showing a general control arrangement for controlling the power transmitting system which has been described hitherto. The control arrangement includes an electronic control device 310 receives input signals indicative of various parameters such as throttle opening angle $\theta$, running speed V of the vehicle, rotating speed Nin at the input side of the CVT 1, temperature Tw of coolant for the engine and selected shift position. The electronic control device 310 controls the solenoid valves 100, 114, 116 and 278 through amplifier stage 314.

The following description provides explanation of advantages or effects of the essential parts of the illustrated embodiment.

An optimum level of the first line pressure Pl1 at the CVT 1, i.e., of the pressure to be applied to the output pulley actuator 5 of the CVT 1, is expressed by the following equation:

$$Pl1 \propto (1+r) \cdot Tin \qquad (4)$$

where, Tin: Input torque of CVT 1 (Tin=output torque Te of engine in the illustrated embodiment).

An optimum level of the second line pressure Pl2 applied to the auxiliary transmission 42 is expressed by the following equation:

$$Pl2 \propto r \cdot Tin \quad (5)$$

Hence, suppose the speed ratio "r" of the CVT 1 ranges from 2 to 0.5, the following equations (6) and (7) are obtained when the speed ratio "r" is equal to 2 (r=2):

$$Pl1 \propto 3Tin \quad (6)$$

$$Pl2 \propto 2Tin \quad (7)$$

When the speed ratio "r" is equal to 0.5 (r=0.5), the following equations (8) and (9) are obtained:

$$Pl1 \propto 1.5Tin \quad (8)$$

$$pl2 \propto 0.5Tin \quad (9)$$

As indicated above, the ratio of the optimum value of Pl1 in the case of r=2 over that in the case of r=0.5, is 2, while the corresponding ratio of the optimum value of Pl2 is 4. Thus, the characteristics of variation in the optimum value are different between Pl1 and Pl2.

Stated in more detail, the pressure levels Pl1 and Pl2 must be adjusted as shown in two-dot chain lines in FIGS. 7-9. In a conventional hydraulic control device, a line pressure generated from a single primary pressure regulator valve is commonly used for both the CVT and the auxiliary transmission. If the line pressure is set at a level high enought to cope with the maximum input torque to the auxiliary transmission, the CVT and the frictional coupling assembly of the auxiliary transmission tend to suffer reduced durability or shortened service life, and the auxiliary transmission tends to be subject to a relatively high shifting shock which gives an adverse effect on the driving comfort of the vehicle. However, the illustrated embodiment of the invention uses the primary pressure regulator valve 198 and the sub-primary pressure regulator valve 220 which provide the first and second line pressures Pl1 and Pl2 that are adjustable to meet the different requirements of the CVT 1 and the auxiliary transmission 42, respectively. This arrangement not only assures reliable power transmission by the CVT 1 and the auxiliary transmission 42, but also minimizes reduction in durability of the CVT 1 and the auxiliary transmission 42 and shifting shocks of the transmission 42 upon its shifting actions, due to excessive line pressure otherwise used for the power transmitting system.

While the present invention has been described in its preferred embodiment, it will be obvious to those skilled in the art that various changes, modifications and improvements may be made within the spirit and scope of the invention defined in the appended claims.

What is claimed is:

1. A hydraulic control apparatus for controlling a hydraulically-operated power transmitting system for an automotive vehicle, the transmitting system having a continuously variable transmission of the belt-and-pulley type and an auxiliary transmission incorporating a frictional coupling assembly and coupled to the output side of the continuously variable transmission, the continuously variable transmission including a first variable-diameter pulley, a second variable-diameter pulley, a transmission belt connecting the first and second variable-diameter pulleys, and first and second hydraulic actuators for changing the effective diameters of the first and second variable-diameter pulleys, respectively, said hydraulic control apparatus comprising:

(a) first pressure-generating means for generating a first line pressure exclusively used to operate one of the first and second hydraulic actuators of the continuously variable transmission, primarily for controlling the tension of the transmission belt;

(b) second pressure-generating means for generating a second line pressure exclusively used to operate the frictional coupling assembly, said second pressure-generating means generating said second line pressure based on an output torque of an engine of the automotive vehicle and on a speed ratio of the continuously variable transmission, wherein:

(c) said hydraulic control apparatus includes a manual valve which has at least two shift positions including a forward-drive position, and (d) said second pressure-generating means comprises:

(i) an input port to which said first line pressure is applied while said forward-drive position is selected;

(ii) an output port from which said second line pressure is generated while said forward-drive position is selected; and (iii) a valve spool for controlling a cross sectional area of fluid communication between said input and output ports, said valve spool receiving a speed-ratio pressure corresponding to said speed ratio, a feedback pressure corresponding to said second line pressure, and a throttle pressure corresponding to an angle of opening of a throttle valve of the engine, said speed-ratio pressure and said feedback pressure acting on said valve spool so as to move said valve spool in one of opposite directions, and said throttle pressure acting on said valve spool in the other direction.

* * * * *